Aug. 21, 1962  R. A. SHARP ET AL  3,049,887
LIQUID CONTROL DEVICE
Filed Feb. 15, 1960

Inventors
RODMAN A. SHARP
MYRON S. EICHEN
By Soans Anderson Luedeka & Fitch
Attys

United States Patent Office 3,049,887
Patented Aug. 21, 1962

3,049,887
LIQUID CONTROL DEVICE
Rodman A. Sharp, La Jolla, and Myron S. Eichen, Solana Beach, Calif., assignors to General Dynamics Corporation, New York, N.Y., a corporation of Delaware
Filed Feb. 15, 1960, Ser. No. 8,676
3 Claims. (Cl. 62—55)

This invention relates to improvements in a liquid level control device. It is of value in the control or maintenance of the level of any liquid which is capable of being evaporated at temperatures and pressures normally encountered within the earth's atmosphere.

The invention in the specific embodiment, selected for purposes of illustration, will be described and shown as applied to the maintenance of the level of a coolant such as liquid air or some other liquid gas which, when liquid, is at a temperature substantially below the freezing point of ordinary, pure water. Such a liquid coolant may be used in a "cold trap" for a gas evacuating system. Examples of cold traps are shown in U.S. Patents Nos. 2,370,703, 2,513,114 and 2,565,722. Another example of such a trap is disclosed in co-pending application, Serial No. 706,066 filed in the name of Wade L. Fite on December 30, 1957 (now U.S. Patent No. 2,949,015, dated August 16 1960), which is owned by the assignee of the invention set forth in the application herein.

In general, it may be said that a cold trap used in gas evacuating systems of the character referred to employs a receptacle containing the liquid coolant, part of the surface of which is open to an ambient atmosphere into which the gas generated by the evaporation of the liquid coolant is discharged. The loss of heat for effecting such evaporation reduces the temperature of the wall of the receptacle, which wall thus serves as a heat exchange medium for lowering the temperature of any fluid which contacts the wall of the receptacle. Said cooling of the gas, evacuated by pumping equipment or other devices, enhances the vacuum by condensing the evacuated gas to a liquid, or in some cases, directly to a solid.

The level of the liquid coolant in performing its proper function, as above described, should preferably be maintained within a relatively narrow range in order to maintain the efficiency of the cold trap. Hence, it is desirable to be able to supply additional coolant into the receptacle of the trap from time to time from a supply of the same or similar coolant liquid stored in a tank or reservoir which is preferably well insulated and capable of holding enough coolant to supply the cold trap or traps in operation over a considerable period of time so that it will not be necessary to replenish the reservoir except at a convenient time.

The primary purpose of the invention herein described is to provide a simple and efficient cryogenic trap filling system in which the level of the coolant is maintained automatically within a close range.

In order to effect a proper transfer of the reserve liquid from the reservoir to the cold trap receptacle, there is provided a conduit extending from the reserve tank to the trap. The conduit has an inlet opening below the level of the liquid in the tank and a delivery opening into the upper part of the trap receptacle, and which delivery opening is above the level of the liquid in the tank so that syphoning from the tank into the trap will not occur. The delivery inlet is located above the normal level of the liquid in the trap receptacle, and preferably above the uppermost level of the liquid in the receptacle, so that syphoning of the liquid from the trap into the reservoir will not occur.

By the use of certain instrumentalities controlled or actuated by the sensing element, the pressure in the tank or reservoir in which the reserve supply of coolant is normally kept at approximately atmospheric pressure is raised in either one of various ways. One way is merely to prevent the escape of gas from the reservoir while either forcing outside gas into the reservoir or allowing the normal evaporation from the surface of the liquid in the reservoir to build up the pressure. Another way is to supply heat to the reservoir or to the liquid therein so as to cause evaporation of the liquid. However, the use of both methods is preferred, and is described herein.

As described herein, the receptacle of the trap in which the liquid coolant is to be maintained at a substantially constant level is provided with an element or means capable of sensing the rise or fall of the liquid in the trap. In its preferred form, said element has an electric characteristic which is altered by the change in the level of the liquid.

Said sensing element may be a thermistor in which the electric resistance character of the element is susceptible of being greatly altered by relatively slight changes in temperature within a selected range. This property is of particular value in the case of the present invention, because a minute variation in the depth of immersion of a solid material in a body of coolant in the form of a normally gaseous material which has been reduced to a liquid form under a condition of heavy pressure and reduced temperature, effects a significant change in the temperature of the solid material and a corresponding important change in the electrical resistance of the thermistor.

For some uses, where it is desirable to be able to maintain the level of the coolant in the trap constant or within an extremely close range, it is preferred to employ two sensing elements vertically spaced by an amount or distance which will suit the particular conditions encountered. The lower element serves to build up the pressure in the reservoir and the upper element serves to relieve the pressure when the refilling operation has restored the liquid to its proper level. This has an effect in insuring a sharper and more positive operation of the system in the even of large variations in the depth of coolant in the storage reservoir, which variations are naturally accompanied by large variations in the volume of the gas space above the level of the liquid in the storage tank. Such a two element arrangement is disclosed herein.

Various instrumentalities of the system are illustrated in a diagrammatic manner in the drawings accompanying this application in view of the fact that a detailed description of the trap, or of the other instrumentalities, is not essential to enable the invention to be understood by a person skilled in the installation of cold traps used in gas evacuation systems. For a similar reason, the control circuits are illustrated in diagrammatic form.

Figure 1:
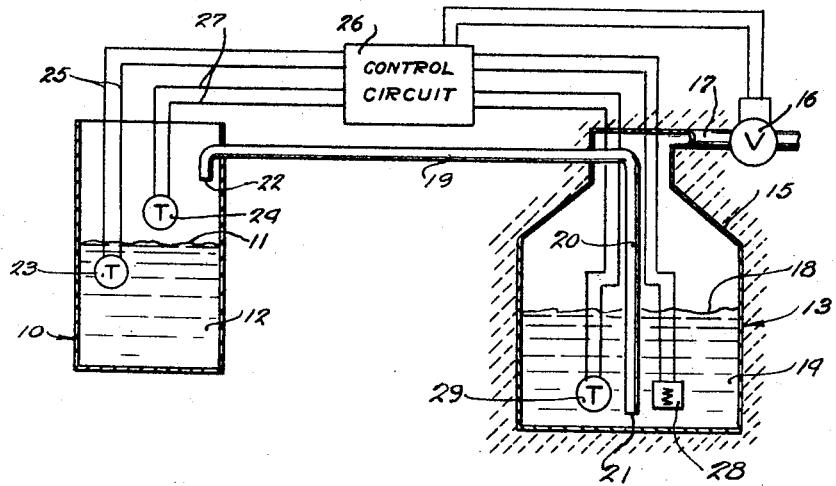
FIGURE 1 is a diagrammatic view of a trap and the filling arrangements.

Referring to FIGURE 1 of the drawings, the numeral 10 indicates the receptacle of the cold trap, the wall of which receptacle is contacted by the gases passing from the vacuum chamber to the evacuating apparatus. It will be observed that the upper end of the trap 10 is not closed, but is open to the atmosphere so that the surface 11 of the liquid coolant 12 is at atmospheric pressure and the gases which evaporate from the surface thereof are vented freely to the atmosphere. Preferably, the coolant is liquid air or other gas which will not contaminate the atmosphere, for example, nitrogen.

The tank or reservoir 13, in which a reserve supply of coolant 14 is contained has a top closure 15 which may be vented into the atmosphere by an electrically controlled vent valve 16 which, during the filling operation, closes the gas escape duct 17 leading from the space in the upper part of the tank and above the level 18 of the reserve supply of liquid coolant.

In order to enable the coolant to be delivered to the trap 10 from the reservoir 13 a conduit or filler pipe 19 extends from the reservoir to the trap. The reservoir end of the pipe 19 has a leg 20 which extends down into the liquid coolant 14 and has an inlet 21 at a point not too far from the bottom of the reservoir. Said conduit 19 connects the reservoir with the trap and has a substantially horizontal leg with a downward directed delivery opening 22 located a substantial distance above the normal level 11 of the liquid coolant in the trap 10. The pipe 19 and the leg 20 are normally not filled with liquid because the tank and the trap are at about the same pressure.

With this arrangement, whenever normal evaporation of coolant from the surface of the coolant in the reservoir 13 occurs, the solenoid vent valve 16 is normally open so that pressure does not accumulate in the reservoir. However, when the vent valve is closed, any evaporation of gas will more or less rapidly build up sufficient pressure in the upper end of the reservoir 13 to force the liquid coolant through the opening 21 and up the vertical leg 20, and finally along the horizontal leg 19 of the conduit so that it will be discharged from the opening 22 and delivered into the trap receptacle 10 to raise the level 11 of the liquid coolant 12. It will be understood that in order to prevent unnecessary consumption of the liquid coolant, which is somewhat expensive, the reservoir 13 and the closure 15 are well thermo-insulated.

Preferably, the trap receptacle 10 is equipped with a pair of vertically spaced thermistors 23 and 24, the lower thermistor 23 being positioned slightly below the average coolant level 11. The upper thermistor 24 is located at a lower level than the filler pipe delivery opening 22 and a sufficient distance above the level 11 of the liquid coolant, so that the level of the liquid 11 can be controlled within a sufficiently close range. As indicated in FIGURE 1, the lower thermistor 23 is connected to lines 25 leading into the electrical control apparatus 26 which, as will later appear, functions to close the solenoid vent valve 16 when the liquid level 11 falls below the level of the lower thermistor 23. The upper thermistor is connected to the control circuit 26 by lines 27, and as will later appear, functions to open the solenoid vent valve 16 when the level 11 of the coolant in the trap receptacle 10 operatively engages the upper thermistor 24.

In order to accelerate the generation of gas in the insulated tank 13 when it is necessary to refill the coolant receptacle 10, it is preferred to employ an electrical heating element 28 which is also energized through the agency of the lower thermistor 23 in the trap at the same time that the solenoid vent valve is closed by said thermistor 23. Said heater element 28 is deenergized through the action of the upper thermistor 24 when sufficient of the coolant liquid has been delivered into the trap receptacle 10.

In order to insure that there will always be an ample supply of liquid coolant in the reservoir tank 13, it is preferable to locate a third thermistor 29 in the lower part of the tank 13, the function of which thermistor 29 is to actuate a signal lamp or other alarm device when the reservoir 13 should be recharged with coolant.

The control circuit 26, one example of which is shown in the drawings, preferably employs a device such as a flip-flop multivibrator, which is designed to operate in one way when the level 11 of the liquid in the receptacle drops below the lower level thermistor 23, and in the opposite way when the liquid level 11 rises in the receptacle to activate the upper level thermistor 24. In the first case, the solenoid-operated vent valve 16 is closed and the heater element 28 is energized, and in the second case, the vent valve 16 is opened and the heater element 28 is de-energized.

The multivibrator includes a pair of p-n-p type transistors 30 and 32 connected with their emitters 33 and 34 grounded. Bias is provided for the collectors 35 and 36 of the transistors 30 and 32, respectively, by a direct current power source, such as a battery 37, the negative terminal of which is connected through a load resistor 38 to the collector 35 of one of the transistors 30 (hereinafter referred to as the first transistor). The collector 36 of the other transistor 32 (hereinafter referred to as the second transistor) is connected through the solenoid 16 and the heater element 28 to the negative terminal of the collector battery 37.

Bias voltage is provided for the bases 39 and 40 of the transistors 30 and 32, respectively, by a direct current power source 42, the positive terminal of which is connected through base resistors 43 and 44 to the bases 39 and 40 respectively, of the transistors 30 and 32.

The output voltage from the collector 35 of the first transistor 30 is connected to the base 40 of the second transistor 32 by means of the upper level thermistor 24. The collector 36 of the second transistor 32 is connected to the base 39 of the first transistor 30 by means of a feedback resistor 45. Additional bias voltage is provided for the base 40 of the second transistor 32 by connecting the negative terminal of the collector battery 37 through a dropping resistor 46 and the lower level thermistor 23 to the base 40 of the second transistor 32.

When the liquid level 11 in the receptacle 10 covers both the lower and upper level thermistors 23 and 24, the resistance of both of the thermistors 23 and 24 is relatively high. Consequently, a relatively high positive bias voltage is applied to the base 40 of the second transistor 32 which reduces the collector current of the second transistor 32. The reduction in the collector current, in turn, increases the negative voltage fed back through the feedback resistor 45 to the base 39 of the first transistor 30. This feedback of negative voltage reduces the positive bias to the base 39 of the first transistor 30 and thereby increases the collector current of the first transistor 30. This increase in collector current in turn further reduces the negative voltage fed through the upper level thermistor 24 to the base 40 of the second transistor 32. Ultimately, the second transistor 32 reaches a cut-off condition and the first transistor 30 becomes saturated. In a cut-off condition, there is little or no current flowing in the collector circuit of the second transistor 32, and hence, the vent valve 16 is open and the heater element 28 is de-energized.

If the liquid level 11 drops in the receptacle 10, the upper level thermistor 24 is exposed to a higher temperature and decreases in resistance, thereby feeding more negative voltage to the base 40 of the second transistor 32. Hence, the positive bias on the second transistor 32 is reduced. However, the circuit components are selected so that this reduction of positive bias is not sufficient to allow the second transistor 32 to conduct.

When the liquid level 11 drops below the position of the lower level thermistor 23, the resistance of the lower level thermistor 23 decreases to a relatively low value. The resulting decrease in positive voltage applied to the base 40 increases the collector current, and hence decreases the negative voltage fed from the collector 36 of the second transistor 32 to the base 39 of the first transistor 30. This, in turn, causes a decrease in the collector current of the first transistor 30, and hence, an increase in the negative voltage fed to the base 40 of the second transistor 32. This reduces the positive bias on the second transistor 32 sufficiently to allow the second transistor 32 to conduct. The increased flow of collector current further reduces the negative voltage fed through the feed back resistor 45 to the base 39 of the first transistor 30, thereby reducing the collector current of the first transistor 30. Finally, the first transistor 30 becomes cut-off and the second transistor 32 saturated. Thus, the solenoid 16 and the heater element 28 become energized, thereby closing the gas escape duct 17 and boiling the liquid in the reservoir 13 sufficiently to cause liquid to flow from the reservoir 13 to the receptacle 10.

A diode 47 is connected in parallel with the solenoid 16 to reduce transients in the collector current caused by the inductance of the solenoid 16. A pilot light 48 is also connected in parallel with the solenoid 16 in order to indicate when the solenoid 16 is energized.

As the receptacle 10 fills, the lower level thermistor 23 is immersed in the liquid and thus increases in resistance. However, the circuit components are selected so that this increase in resistance does not increase the positive bias sufficiently to cut off the second transistor 32. When the liquid level 11 reaches the upper level thermistor 24, the upper level thermistor 24 increases in resistance whereby the negative voltage fed to the base 40 of the second transistor 32 is reduced. This reduction in negative voltage causes the collector current of the second transistor 32 to reduce. Hence, the negative voltage fed to the base 39 of the first transistor 30 increases, thereby allowing the collector current to increase and reduce the negative voltage fed back to the second transistor 32. Finally, the second transistor 32 becomes cut off and the first transistor 30 becomes fully saturated. Consequently, the solenoid 16 and heater element 28 are de-energized.

As previously indicated, a circuit is provided to indicate when the liquid within the reservoir has dropped below a certain level. In the illustrated embodiment, the circuit includes the third thermistor 29 disposed in the lower part of the reservoir 13 and connected in series with a relay 49. The series combination is connected across the collector battery 37. Consequently, if the liquid is reduced to a level below the third thermistor 29, the thermistor 29 reduces in resistance and thereby allows the relay 49 to be energized. The relay 49 operates a pair of contacts 50 and 52. One of the contacts 50 is a normally open contact and is connected into an alarm circuit 53 so as to actuate an alarm when the relay 49 is energized.

The second contact 52 is a single pole-double throw contact. In its normally closed position, the single pole-double throw contact 52 is connected in series with the collector circuit of the transistors 30 and 32. The normally open terminal 53 is connected through a dropping resistor 54 to a pilot light 53. Accordingly, if the level in the reservoir 13 drops below the thermistor 29, the alarm is sounded and the heater element 28 and solenoid 16 are de-energized.

In the illustrated embodiment, a manually operated double pole-double throw toggle switch 56 is provided in the collector circuit of the second transistor 32, so that the liquid level in the tank may be tested without filling the receptacle 10. One side 57 of the switch 56 is connected in series with the solenoid 16 so that normally the solenoid 16 is connected to the collector 36 of the second transistor 32 and in the switch's other or level test position, the solenoid 16 is disconnected from the collector circuit.

The other side 57 of the switch 56 is connected in series with the heater element 28 so that in its normal position, the heater element 28 is connected to the collector 36 of the second transistor 32. In the switch's level check position, the heater element 28 is connected to the positive terminal of the collector battery 37. Thus, the heater element 28 is connected across the collector battery 37.

Accordingly, when it is desired to test the liquid level in the reservoir 13, it is only necessary to throw the double pole-double throw toggle switch 56 to the test position. In this test position, the heater element 28 will be activated without energizing the solenoid 16. If the liquid level is below the thermistor 29, the heater element 28 heats the thermistor 29, reducing its resistance sufficiently to actuate the relay 49 which operates the alarm 53. Consequently, the level of the reservoir 13 may be tested without causing liquid to flow into the receptacle 10.

Figure 2:
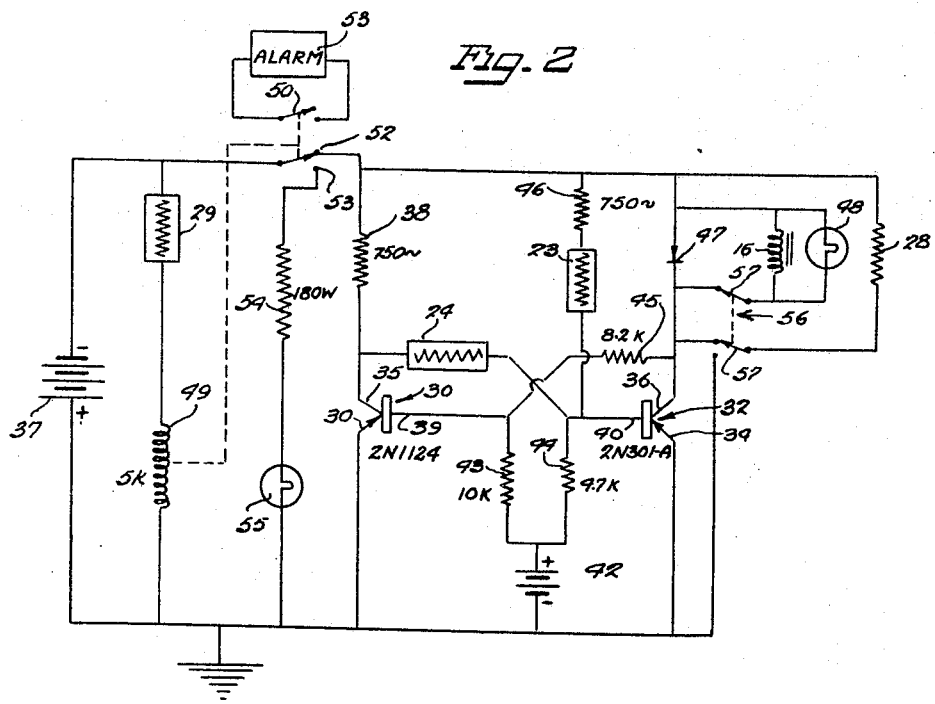
FIGURE 2 is a circuit diagram showing the manner in which the various electrical instrumentalities and devices controlled thereby are connected and arranged.

In one illustrative embodiment of the control circuit, the values of circuit components are selected as indicated in FIGURE 2. The upper level thermistor and the lower level thermistor are approximately 2.5 ohms at room temperature and greater than 1 megohm at liquid nitrogen temperature. The third thermistor is 2 kilohms at room temperature.

Various of the features of the invention believed to be new are set forth in the appended claims.

We claim:

1. In a gas evacuating system provided with a cold trap having a receptacle for containing a limited supply of liquid coolant at a normal atmospheric pressure, which coolant at sea-level pressure is capable of being evaporated at a temperature substantially below the freezing point of water, and which receptacle is at a pressure approximating that of the ambient atmospheric pressure, the combination of a tank containing a reserve supply of said liquid, a conduit for conducting liquid from the tank to the receptacle and having an inlet below the level of said liquid reserve, and an outlet which is above the level of the liquid in the tank and also above the upper level of the liquid in the receptacle, said tank having a vent above the level of the reserve liquid for normally discharging, into the ambient atmosphere, gas evaporated from the upper surface of the liquid in said tank, means for sensing rise or fall of the liquid in the receptacle, and means controlled by the sensing means for heating said liquid in said tank and closing said vent to enable the evaporation of tank liquid to build up pressure in said tank so as to cause liquid to flow from said tank through said conduit into said receptacle.

2. Means for substantially maintaining the level of a volatile liquid in a receptacle by feeding into said receptacle from a normally vented tank containing a reserve supply of such liquid an amount of such liquid sufficient to compensate for any diminution of the quantity desired in the said receptacle, which means comprises a conduit for conducting liquid from the tank to the receptacle and having an inlet immersed in the liquid in the reserve tank, and an outlet into the receptacle above the level of the liquid in the receptacle, a thermistor positioned to be activated by a lowering of the level of said liquid in the receptacle, a thermistor positioned to be activated by a rise in the level of said liquid in the receptacle above its normal level, electric means capable of being energized by said first named thermistor for increasing the gas pressure in the tank and thereby causing liquid to flow from said tank into said receptacle, and capable of being energized by said second mentioned thermistor for lowering the gas pressure in the tank and thereby arresting the flow from said tank into said receptacle, said gas pressure increasing means including a heater for accelerating the rate of evaporation of said tank fluid, and means for limiting the escape of gas generated in said tank during the said feeding operation.

3. Means for maintaining the level of a volatile liquid in a receptacle by feeding into said receptacle from a normally vented tank of such liquid an amount of such liquid sufficient to compensate for any diminution of the quantity desired in the said receptacle, which means comprises a conduit for conducting liquid from the tank to the receptacle and having an inlet located in the tank below the level of the liquid in the tank, and an outlet above the level of the liquid in the receptacle, a thermistor positioned to be activated by a lowering of the level of said liquid in the receptacle, a thermistor positioned to be activated by a rise in the level of said liquid in the receptacle above its normal level, electric means capable of being energized by said first named thermistor for increasing the gas pressure in the tank and thereby causing liquid to flow from said tank into said receptacle, and capable of being de-energized by said second mentioned thermistor for lowering the gas pressure in the tank and thereby arresting the flow from said tank into said receptacle, said gas pressure increasing means including a heater for accelerating the rate of evaporation of said tank fluid, and means for limiting the escape of gas generated in said tank during the said operation.

References Cited in the file of this patent

UNITED STATES PATENTS

| | | |
|---|---|---|
| 1,853,983 | Leach | Apr. 12, 1932 |
| 2,182,684 | Venable | Dec. 5, 1939 |
| 2,443,724 | Cibulka | June 22, 1948 |
| 2,609,668 | Dalton | Sept. 9, 1952 |
| 2,655,933 | Odell | Oct. 20, 1953 |
| 2,667,178 | Fred et al. | Jan. 26, 1954 |
| 2,756,765 | Agule et al. | July 31, 1956 |

OTHER REFERENCES

"Advances In Cryogenic Engineering" (Timmerhaus), published by Plenum Press, Incorporated (New York), 1960. Proceedings of the 1954 Cryogenic Engineering Conference (pages 158–161 relied on).